Patented Feb. 26, 1946

2,395,774

UNITED STATES PATENT OFFICE 2,395,774

CHEMICAL METHOD

Earl Amott, Berkeley, and Wallace E. Grebe, Long Beach, Calif., assignors to Union Oil Company of California, Los Angeles, Calif., a corporation of California No Drawing. Application August 16, 1943, Serial No. 498,878

9 Claims. (Cl. 260—504)

This invention relates to a method for the production of sulfonic acids and the conversion of sulfonic acids so produced into salts of various metals.

Sulfonic acids are conventionally produced by the reaction of fuming sulfuric acid on various types of mineral oil, and these acids are commonly converted to salts by neutralization with an alkaline compound of the desired metal. In carrying out the preparation of calcium sulfonate for example, according to a method disclosed in copending application Serial No. 440,389, mineral oils having either a naphthenic or paraffinic base are thoroughly agitated with fuming sulfuric acid for a period between about ten minutes and sixty minutes although very good yields of sulfonic acids have been obtained in contact periods as short as one second. The entire reaction product including sludge, unreacted oil and sulfonic acids is then contacted immediately with lime slurry to neutralize the sulfonic acids and also the inorganic acids such as sulfuric acid which are present in the resulting mixture. The neutralized mass is then allowed to settle for the separation of water and solids such as excess lime and the calcium sulfate which is formed by the reaction of the lime with the free sulfuric acid. This separation step may be facilitated, if desired, by diluting the mixture with petroleum naphtha, liquid propane, liquid butane, liquid pentane or benzol or the like, either before or after the addition of the alkali. During the settling step the bulk of the solids and nearly all of the free water stratifies as a lower aqueous layer which is drawn off, leaving a hydrocarbon layer consisting essentially of naphtha, oil, sulfonates and a small amount of water in solution. This hydrocarbon layer, however, may also contain an appreciable amount of suspended solids, and usually it must be clarified by further settling, centrifuging or filtration. The clarified product may then be subjected to a distillation treatment to remove the diluent and dissolved water.

It has been observed that when a large excess of lime is used in the neutralization step of the above process, considerable difficulty is encountered in the succeeding separation step, in obtaining rapid and clean settling of the aqueous layer, and in clarifying the hydrocarbon layer, even when a diluent such as naphtha is employed. The sulfonic acid soaps or other reaction products produced by the method stated above appear to stabilize the emulsion and to peptize the solids with the result that the rate of through-put is reduced, valuable oil, sulfonates, etc., are lost to the aqueous layer, and stable suspensions are formed in the hydrocarbon layer which makes the said layer practically impossible to clarify by settling or mild centrifuging, and extremely difficult to clarify by filtration. As a result a severe centrifuging or a very slow cumbersome filtration must be resorted to.

It is an object of our invention to overcome these difficulties of separation, and provide a process wherein the separation and clarification may be accomplished by simple settling or by mild centrifuging.

We have discovered that in the preparation of sulfonates by the method described above the rate of settling and the ease of clarification of the hydrocarbon layer are both functions of the acidity of the neutralization product as measured by the pH of the water layer. For a strongly alkaline neutralization product, such as one with a water layer having a pH over about 9.5, the emulsion formed between the aqueous and hydrocarbon layers, and also the suspension of solids in the hydrocarbon layer are both extremely stable. On the other hand, for a neutral or slightly acidic neutralization product, rapid breaking of the emulsion and coagulation of the solids occurs thereby greatly facilitating the settling and clarification operations and minimizing losses. It is desirable, however, that the neutralized mixture should not be acidic, at least not highly acidic, i. e., have a pH below about 5.0, since the presence of such acidic mixtures results in corrosion of equipment, reduces the stability of the product to color degradation during subsequent treatment or use, and also results in a lesser degree of a yield of sulfonate salts. Our invention lies primarily, therefore, in an improvement in the above process for the preparation of sulfonates which involves controlling the neutralization of the sulfonic acid mixture in such a manner that the pH value of the water layer of the neutralized product is not above 9.5 and not greatly below 5.0 and preferably lies between 7.0 and 9.0. As a result, we effectively improve the separation and clarification characteristics of the hydrocarbon layer and at the same time minimize corrosive effects and losses in yield of desired products, and thus accomplish the above objects of the invention.

We have found that we can control the acidity as stated above, by either of the following methods: (1) By employing a strong base such as calcium oxide or hydroxide and limiting the quantity employed so as to avoid an appreciable excess of said base over that stoichiometrically required, or (2) by using a buffer solution containing a salt of a weak acid and a strong base, with or without additional strong base. As a specific example of a buffer solution containing a strong base, we may employ a solution containing calcium hydroxide or lime slurry together with less than an equivalent amount of added carbon dioxide or with calcium carbonate, in amounts such as to give the desired pH, that is not above 9.5 and not greatly below 5.0, and preferably between 7.0 and 9.0. As another alternative neutralizing solution and a preferable one, we may employ one containing an excess of calcium carbonate. Also, in place of carbon dioxide or carbonate salts, in the first example above, other weak acids such as sulfur dioxide, acetic acid, and the like or metal salts of such acids may be employed to control the pH.

After this revised neutralization treatment of this invention, the regular practice of completing the preparation of the sulfonate salts as stated above may be continued, that is, the diluent, if not added earlier, may be added if desired, and such blended into the hydrocarbon layer. The hydrocarbon layer may then be clarified by settling, mild centrifuging, or filtration. With this revised treatment, simple settling is frequently all that is necessary, although mild centrifuging or filtration may be employed if desired.

In conjunction with the above improved method of clarification, the following improvement, which is primarily a supplementing method of expediting the clarification of the hydrocarbon layer, although it may be used separately as distinguished from pH control method stated above to great advantage, may be used if so desired.

As a result of the settling step, which follows the neutralization step, in the above mentioned method for the preparation of sulfonates, the bulk of the solids and nearly all the free water stratifies as a lower aqueous layer which is drawn off leaving a hydrocarbon layer consisting essentially of a diluent (such as naphtha), unsulfonated oil, sulfonates, and a small amount of water in solution. This hydrocarbon layer, however, may also contain an appreciable amount of suspended and dissolved inorganic solids. The presence of the dissolved water in the hydrocarbon layer operates as a carrying medium for the dissolved inorganic compounds, thereby lowering the efficiency and rapidity of clarification of the said hydrocarbon layer. Our improvement constitutes the removal of the said dissolved water so that the solids may readily be removed by filtration or mild centrifuging, if so desired. As a means for accomplishing this desired result, a stripping operation is used immediately following the above mentioned settling step, and prior to the filtration or centrifuging step, whereby the hydrocarbon layer is stripped by distillation of dissolved water at temperatures sufficient only to vaporize the said water and part of the said diluent. The vaporized water and diluent taken overhead is condensed and allowed to separate into a water layer and a diluent layer. The latter is returned from the stripper overhead separator back down to admix with the dry hydrocarbon solution of soaps and suspended solids which remained in the bottom of the column during distillation, this product is then filtered or centrifuged and because of the absence of dissolved water in the hydrocarbon layer, an increased rate and efficiency of clarification will be obtained.

This invention will also apply to the preparation of salts of sulfonic acids other than the calcium salts, especially those of the other alkaline earth metals, such as strontium and barium, although it also applies to the preparation of sulfonates of other metals of group 2 such as magnesium and zinc, and other polyvalent metals such as aluminum, iron and the like, as well as metals of group 1 such as the alkali metals, sodium and potassium, as well as copper and silver, and the like.

This invention is applicable also to preparation of metal sulfonates by processes involving various modifications of the above method. In one such modification for example, a limited amount of a neutralizing agent is first used to neutralize only the inorganic acids such as sulfuric acid without neutralizing the sulfonic acids, the resulting aqueous layer containing the bulk of the solids is withdrawn, a diluent is added to the hydrocarbon layer if desired, and the layer is then treated with the desired neutralizing agent so that the pH value of the neutralized product is not greatly above 9.5 and not greatly below 5.0, but preferably between 7.0 and 9.0, as described above.

Another modification of the above process in which this invention can be used is in the production of sulfonates as a by-product of the production of white oils. This method is distinguished from the pre-neutralization process and the single-neutralization method by the fact that the sludge which is created by the reaction of fuming sulfuric acid and the selected mineral oil is separated out and disposed of before adding any neutralizing agent.

The neutralization treatment of this invention also applies to any other method wherein calcium soaps are prepared from mixtures containing sulfonic acids, especially where the sulfonic acids are in the presence of hydrocarbons which were present during the sulfonation. It is most effective however, in the single-neutralization process first described above.

As a specific example of the application of this invention, we used as stock S. A. E. 40 lubricating oil from naphthenic California crude with a V. I. of 36 and V. G. C. of 0.853 with a pour point of $-15°$ C. A number of batch tests were run on this stock along with other types of stock somewhat similar in nature. The following five examples and their results were selected as true representatives of the results obtained by our research. In the above mentioned batch tests, we employed about 90 to 100 grams of S. A. E. 40 lubricating oil from naphthenic California crude as stated above. This lubricating stock was sulfonated with fuming sulfuric acid (30% $SO_3$ by weight) employing a ratio of 34 grams of acid per 100 grams of oil, and thoroughly agitating at a temperature of 80° F. to 120° F. for a period of 15 minutes. Acid was added slowly for the first 10 minutes. The resulting product was then neutralized by adding the acid oil mixture over a five minute period to a slurry of lime or calcium carbonate at a temperature of 180° F. to 200° F. in accordance with data chart shown below, the results obtained thereof are also shown therein. Following the neutralization step, a diluent was added, that is naphtha (200° F.–300° F. boiling point) in the amount of 100 volume percent of the lubricating oil stock charge. The resulting product was allowed to settle until a clean separation of water and naphtha layer was obtained, thus creating a lower water layer and an upper hydrocarbon layer. The pH value was determined on the above mentioned water layer. The settling inches of clear oil layer per hour was determined by measurement while settling in a 250 ml. graduated cylinder. The clarification rate by centrifuging was determined in the following manner: 100 ml. of the settled naphtha layer was centrifuged at 500 times gravity in a 100 ml. centrifuge tube until the supernatant solution was substantially free of suspended matter. This point was determined by inspecting the sample tube periodically, clarity being that point at which no diffusion of strong transmitted light was observed. The acid number was obtained on the solvent-free hydrocarbon layer following the final stripping step by use of the oil acid number method. If the acid number of the final product should still be too high for commercial purposes, a base may be added just prior to the distillation step, the amount required being determined by testing the naphtha layer for acid number and thereby reduce said acid number down to and within the prescribed or desired range. The corrosiveness of the solvent free hydrocarbon fraction, that is the final product, was determined by the steel immersion method.

| Run No. | Millimols. Ca(OH)$_2$ in 200 ml. of water | Ratio to sulphuric in grams (approx.) | Ratio to sulphuric in mols. (approx.) | pH on water layer | Settling, inches of clear oil layer per hr. | Min. to clarify by centrifugation at 500 x G. | Acid number on solvent free hydrocarbon layer | Corrosive effect |
|---|---|---|---|---|---|---|---|---|
| 1 | 433 | 1.0 | 1.24 | 10+ | ¼ | 60+ | 1.1 mg. KOH/grams | Non-corrosive. |
| 2 | 366 | 0.85 | 1.05 | 9.2 | 2 | 15 | 1.6 mg. KOH/grams | Substantially non-corrosive. |
| 3 | 362 | 0.84 | 1.037 | 7.2 | 4 | 4 | 1.7 mg. KOH/grams | Do. |
| 4 | 358 | 0.83 | 1.025 | 5.3 | 12 | 2 | 2.4 mg. KOH/grams | Somewhat corrosive. |
| 5 | [1] 500 | 1.46 | 1.30 | 5.0 | 12 | 2 | 3.5 mg. KOH/grams | Corrosive. |

[1] Calcium carbonate.

An interpretation of the above data will show the relative importance of controlled pH, that is not greatly above 9.5 and not greatly below 5.0, and preferably between 7.0 and 9.0. With decreasing pH value, there is an increase in settling and clarification rate. In conjunction with this phenomena there is a gradual increase in acid number with the resulting effect of increased corrosiveness. By selecting the preferable range limit, that is a pH not above 9.0 and not below 7.0, we reap the advantage of very good settling and clarification rate without the detriment of high corrosiveness. If even greater settling and clarification rate is desired, the pH value may be lowered, and one of the recognized inhibitors introduced into the resulting product so as to counteract the increased corrosiveness.

The foregoing exemplary description of our invention is not to be considered as limiting since many variations may be made within the scope of the following claims by those skilled in the art without departing from the spirit thereof.

We claim:

1. A method of preparing sulfonic acid metal soaps which comprises reacting a hydrocarbon lubricating oil with sulfuric acid and thereby forming a reaction mixture comprising sulfonic acids dissolved in unreacted oil, adding sufficient alkaline compound of said metal to said reaction mixture including sludge, unreacted oil and sulfonic acids to adjust the pH of said mixture within the limits of approximately 9.5 and 5.0, settling said mixture and thereby forming an upper phase containing sulfonates in oil and a lower phase containing free water and solids and separating said phases.

2. A method according to claim 1 in which the alkaline material comprises an alkaline earth metal.

3. A method according to claim 1 in which the alkaline material comprises an alkaline calcium compound.

4. A method of preparing sulfonic acid alkaline earth metal soaps which comprises reacting a hydrocarbon lubricating oil with sulfuric acid and thereby forming a reaction mixture comprising sulfonic acids dissolved in unreacted oil, and immediately adding a compound of said metal which is a strong base and a buffer to said reaction mixture including sludge, unreacted oil, and sulfonic acids to adjust the pH of said mixture within the limits of approximately 9.5 to 5.0, settling said mixture and thereby forming an upper phase containing sulfonates in oil and a lower phase containing free water and solids and separating said phase.

5. A method according to claim 4 in which the buffer is a metal carbonate.

6. A method of preparing sulfonic acid alkaline earth metal soaps which comprises reacting a hydrocarbon lubricating oil with sulfuric acid and thereby forming a reaction mixture comprising sulfonic acids dissolved in unreacted oil, and immediately adding an excess of a weakly basic compound of said metal to said reaction mixture including sludge, unreacted oil, and sulfonic acids, to adjust the pH of said mixture within the limits of approximately 9.0 and 5.0, settling said mixture and thereby forming an upper phase containing sulfonates in oil and a lower phase containing free water and solids, and separating said phases.

7. A method according to claim 6 in which the weakly basic substance is calcium carbonate.

8. A method of preparing sulfonic acid alkaline earth metal soaps which comprises reacting a hydrocarbon lubricating oil with sulfuric acid and thereby forming a reaction mixture comprising sulfonic acids dissolved in unreacted oil, and immediately adding a limited amount of a compound of said metal which is a strong base to said reaction mixture including sludge, unreacted oil, and sulfonic acids, to adjust the pH of said mixture within the limits of approximately 9.0 and 5.0, adding a hydrocarbon diluent to said mixture, settling said mixture and thereby forming an upper hydrocarbon layer containing sulfonates in oil and diluent and a lower aqueous layer containing free water and solids, separating said layers, treating said hydrocarbon layer with an alkaline material to adjust the acid number of said hydrocarbon layer to 1.0 or below, fractionally distilling said hydrocarbon layer into a heavy fraction comprising sulfonates in oil and a lighter fraction containing diluent, and separating said fractions.

9. A method according to claim 8 in which the strong base is calcium hydroxide.

EARL AMOTT.
WALLACE E. GREBE.